Feb. 27, 1940.  R. A. GOEPFRICH  2,191,987
BRAKE
Filed May 22, 1937  3 Sheets-Sheet 1
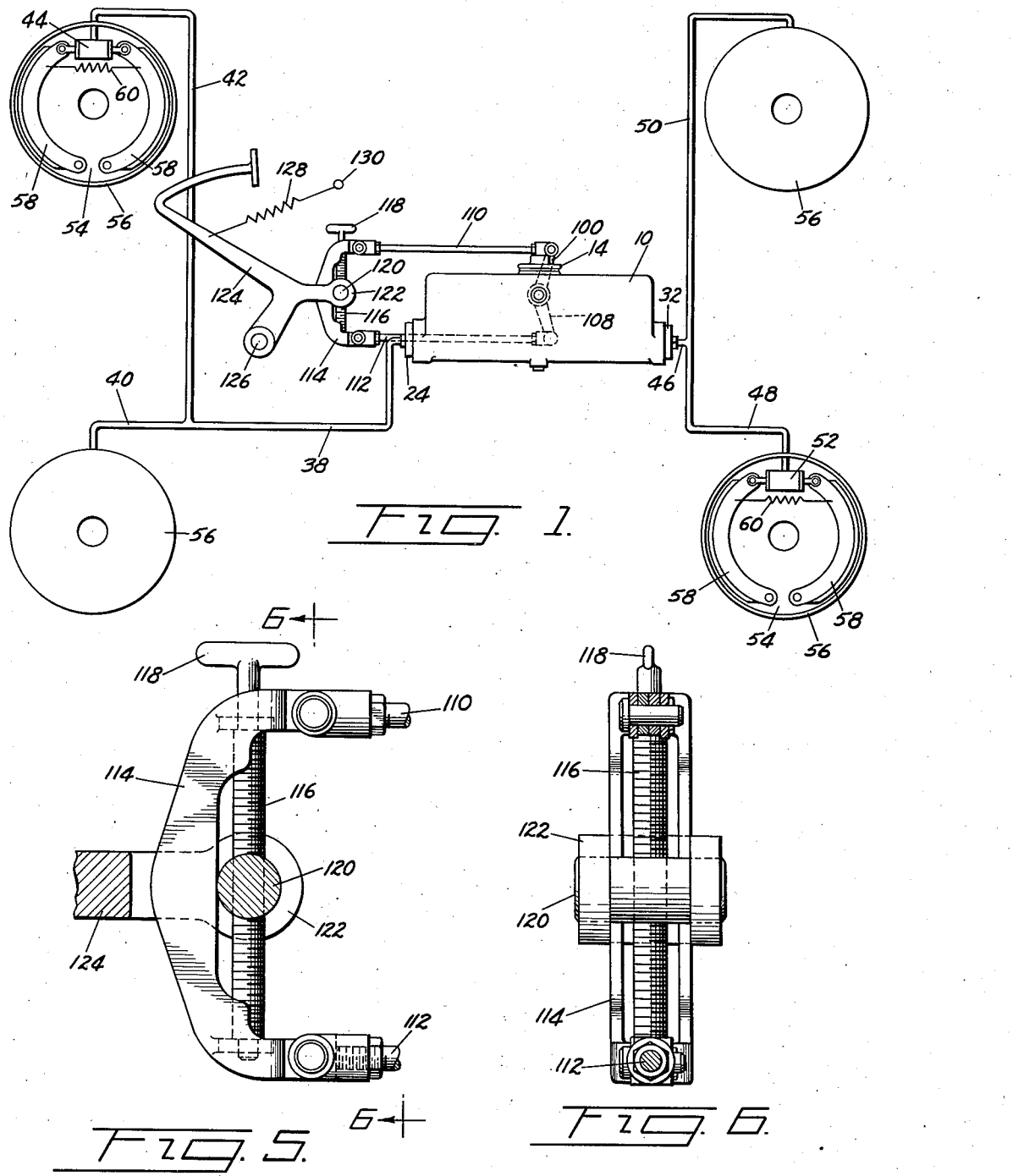
INVENTOR.
RUDOLPH A. GOEPFRICH
BY Jerome R. Cox
ATTORNEY.

Feb. 27, 1940.  R. A. GOEPFRICH  2,191,987
BRAKE
Filed May 22, 1937  3 Sheets-Sheet 2
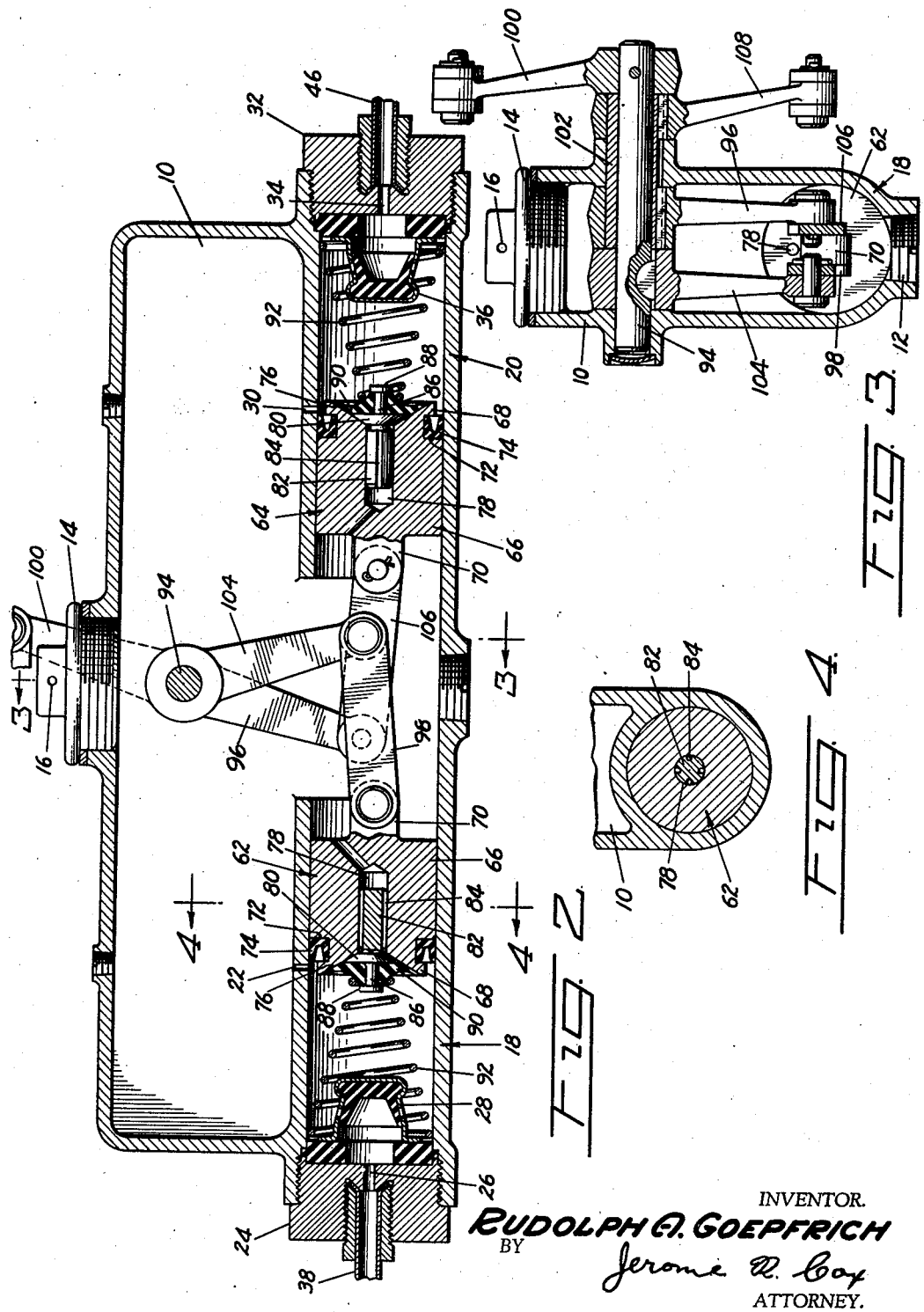
INVENTOR.
RUDOLPH A. GOEPFRICH
BY Jerome R. Cox
ATTORNEY.

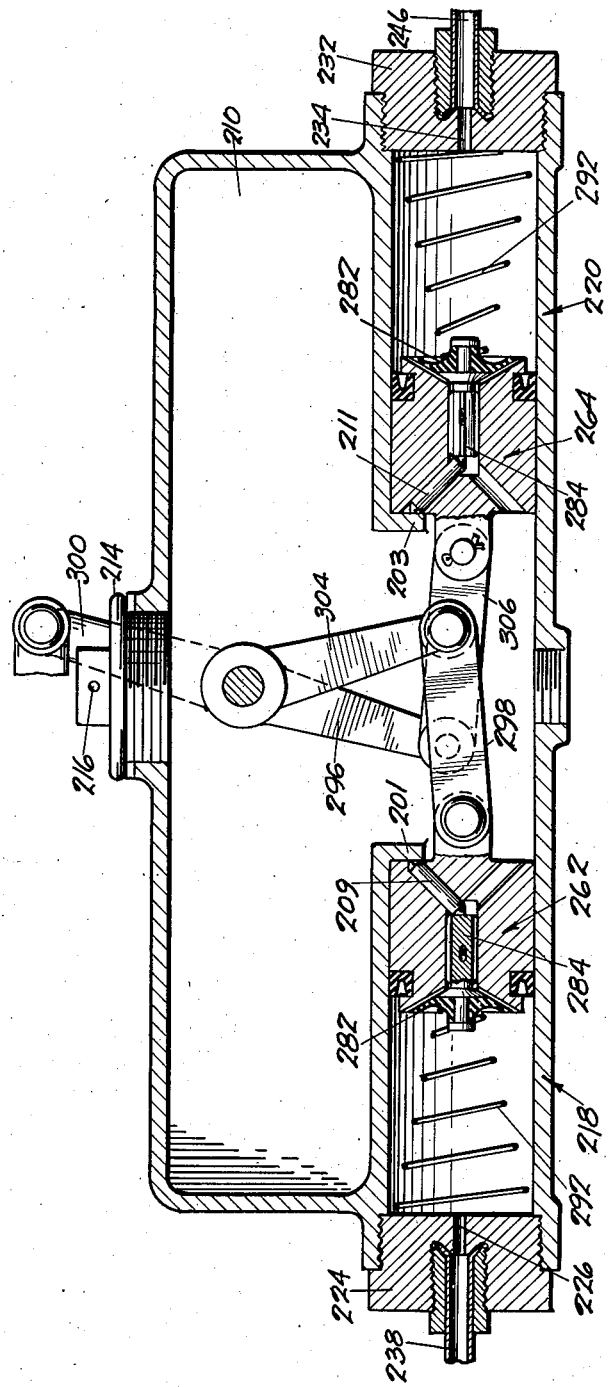

Patented Feb. 27, 1940

2,191,987

UNITED STATES PATENT OFFICE 2,191,987

BRAKE

Rudolph A. Goepfrich, South Bend, Ind., assignor to Bendix Products Corporation, South Bend, Ind., a corporation of Indiana Application May 22, 1937, Serial No. 144,117

2 Claims. (Cl. 188—152)

This invention relates to fluid pressure braking systems.

An object of the invention is to provide a duplex fluid pressure braking system for motor vehicles, one for actuating the brakes associated with the front wheels of a vehicle and another for actuating the brakes associated with the rear wheels of the vehicle.

An object of the invention is to provide a fluid pressure braking system for motor vehicles including two separate systems having a single operating means.

Another object of the invention is to provide a fluid pressure braking system for motor vehicles including two independent systems coupled for concomitant operation with perfect equalization between the systems, or a varied ratio of effectiveness between the systems.

Other objects and advantages of the invention will appear from the following description taken in connection with the drawings forming a part of this specification, and in which, Fig. 1 is a diagrammatical illustration of a fluid pressure braking system embodying the invention;

Fig. 2 is a longitudinal sectional view of the duplex fluid pressure producing device;

Fig. 3 is a vertical sectional view of the fluid pressure producing device substantially on line 3—3, Fig. 2;

Fig. 4 is a sectional view substantially on line 4—4, Fig. 2;

Fig. 5 is a side elevation of the adjusting device;

Fig. 6 is an end elevation of the adjusting device; and

Fig. 7 is a longitudinal sectional view showing another type of duplex fluid pressure producing device similar to that shown in Fig. 2 but varying in details therefrom.

Referring to the drawings for more specific details of the invention, 10 represents a fluid reservoir having a drain opening normally closed by a plug 12 and a filling opening also normally closed by a plug 14 having openings 16 for venting the reservoir to the atmosphere.

A pair of corresponding oppositely disposed cylinders 18 and 20 are arranged in spaced relation to one another in the bottom of the reservoir, and the cylinders open directly into the reservoir. The cylinder 18 has a port 22, providing a communication between the cylinder and the reservoir, and a head 24 provided with a discharge port 26 controlled as by a two-way valve 28. Correspondingly, the cylinder 20 has a port 30, providing a communication between the cylinder and the reservoir, and a head 32 provided with a discharge port 34 controlled as by a two-way valve 36.

A fluid pressure delivery pipe or conduit 38 suitably secured to the head 24 in direct communication with the discharge port 26 has branches 40 and 42 connected respectively to fluid pressure actuated motors 44. Correspondingly, a fluid pressure delivery pipe or conduit 46 has branches 48 and 50 connected respectively to fluid pressure actuated motors 52. The fluid pressure actuated motors 44 and 52 are arranged in pairs, one pair for actuating the brakes associated with the front wheels of the vehicle and another pair for actuating the brakes associated with the rear wheels of the vehicle.

The brakes are preferably of conventional type each including a fixed support or backing plate 54 adapted to be secured to an axle or to an axle housing, a rotatable drum 56 associated with the backing plate and adapted to be secured to a wheel, corresponding interchangeable friction elements or shoes 58 pivoted on the backing plate, and a motor corresponding to the motors 44 and 52 mounted on the backing plate between the friction elements or shoes and operative to move the shoes into engagement with the drum against the resistance of a retractile spring 60 connecting the shoes.

Pistons 62 and 64 reciprocable in the cylinders 18 and 20 each include a body portion 66 having a head 68 and a connector 70. The head 68 has a circumferential groove 72 adjacent its face and in this groove is fitted a leak-proof washer 74 for inhibiting the seepage of fluid past the piston. The head of the piston is slightly reduced in cross-section and has in its face a concentric frustro-conical recess providing a valve seat 76. A passage 78 through the body of the piston opens into the recess so as to provide communication between that portion of the cylinder forward of the piston and the reservoir.

The passage 78 is controlled as by a valve 80 having a stem 82 slidable in the passage, and the stem has longitudinal channels 84 providing for uninterrupted flow of fluid through the passage when the valve is open. The valve has on its head an extension 86 terminating in a knob 88, and a leak-proof washer 90 sleeved on the extension is retained against displacement by the knob. A spring 92 interposed between the two-way valve on the head of the cylinder and the valve 80 normally retains the valves on their respective seats, and the spring also serves to return the piston to its retracted position.

A transverse shaft 94 suitably mounted in the wall of the reservoir has secured thereon within the reservoir an arm 104 connected as by a link 98 to the connector 70 of the piston 62, and keyed to the shaft outside of the reservoir is an arm 100. A sleeve 102 mounted for rotation on the shaft 94 has suitably secured thereon within the reservoir an arm 96 connected as by a link 106 to the connector 70 of the piston 64, and keyed to the sleeve outside of the reservoir is an arm 108.

The arms 100 and 108, keyed to the shaft 94 and to the sleeve 102 respectively, are connected by rods 110 and 112 to the respective ends of a yoke 114. A screw 116 suitably mounted between the ends of the yoke has thereon a hand wheel 118 for rotation of the screw, and a short shaft 120 mounted for travel on the screw has pivotally connected thereto a clevis 122 formed integral with a foot pedal lever 124 pivoted on a suitable support 126 and connected by a retractile spring 128 to a fixed support 130.

By adjusting the screw 116 the leverage may be changed to vary the pressure in the respective systems, or to equalize the pressure in the separate systems to the end that the brake structures may be equalized, or the ratio of effectiveness may be varied so that heavy braking may be applied to one set of brakes and relatively light braking to the other set of brakes.

In operation, upon depressing the foot pedal lever 124, force is transmitted from the lever through the screw 116 to the yoke 114, thence through the links 110 and 112 to the arms 100 and 108 keyed to the shaft 94 and to the sleeve 102, respectively. This movement of the shaft 94 and the sleeve 102 is transmitted through the arms 96 and 104, keyed to the shaft 94 and to the sleeve 102, respectively, and through the links 98 and 106 to the pistons 62 and 64, resulting in movement of the pistons on their compression strokes.

As the pistons 62 and 64 move on their compression strokes, fluid is displaced from the cylinders 18 and 20 past the two-way valves 28 and 30, through the discharge ports 26 and 34 and the fluid pressure delivery pipes or conduits 38 and 46 and their respective branches to the fluid pressure actuated motors 44 and 52, causing actuation of these motors with the resultant movement of the shoes 58 into engagement with the drums 56 against the resistance of the retractile springs 60, so as to effectively retard rotation of the drums.

Upon release of the foot pedal lever 124, the retractile spring 128 becomes effective to return the foot pedal lever to its retracted position. As the foot pedal lever returns to its retracted position, the pistons 62 and 64 are returned to their retracted positions under the influence of the retractile springs 92. The load on the springs 92 may well be such as to materially assist the retractile spring 128 in returning the foot pedal lever to its normal position, or the load on these springs 92 might be only sufficient to urge the valves 80 and two-way valves 28 and 36 to their respective seats.

As the pistons return to their retracted positions, fluid is drawn from the reservoir 10 through the passages 78 past the valves 80 into those portions of the cylinders 18 and 20 forward of the pistons 62 and 64 to completely fill the cylinders. During this period fluid is returning to the cylinders from the fluid pressure actuated motors 44 and 52 under the influence of the retractile springs 60 connecting the respective pairs of shoes of the brake structure, and should the quantity of fluid received by the cylinders 18 and 20 be in excess of the quantity required to completely fill the cylinders all excess fluid is returned from the respective cylinders to the reservoir by way of the compensating ports 22 and 30. At the end of this operation the respective systems are again at rest and ready for a subsequent operation.

In Fig. 7 there is shown a pressure producing device similar in most respects to that shown in Fig. 2 and corresponding parts are indicated by similar numerals with the addition of 200. Stops 201 and 203 are provided which are arranged to contact with plungers 209 and 211 respectively for insuring that the valves 282 will be moved from their seats when the pistons 262 and 264 are returned to their released positions as shown. By this provision for insuring the opening of the valves 282, it is possible to eliminate the valves 28 and 36 and the ports 22 and 30.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. In a fluid pressure braking system, a reservoir, a pair of oppositely disposed cylinders arranged in the bottom of the reservoir and supplied therefrom, fluid pressure actuated motors connected to the cylinders, brakes actuated by the motors, a piston reciprocable in each of the cylinders, a rockable shaft mounted transversely of the reservoir, linkage connecting the shaft to one of the pistons, a sleeve rotatable on the shaft, linkage connecting the sleeve to the other piston, a yoke, linkage connecting one end of the yoke to the shaft, linkage connecting the other end of the yoke to the sleeve, a screw mounted for rotation on the yoke, a pintle mounted for travel on the screw, and a foot pedal lever having an arm pivoted on the pintle.

2. A master cylinder device comprising axially aligned cylinders having pistons mounted therein, a shaft between the pistons having a sleeve mounted thereon, connections between the respective pistons and the shaft and sleeve, and means for rocking the shaft and sleeve.

RUDOLPH A. GOEPFRICH.